United States Patent
Sugaya

(10) Patent No.: US 10,792,817 B2
(45) Date of Patent: Oct. 6, 2020

(54) SYSTEM, METHOD, AND PROGRAM FOR ADJUSTING ALTITUDE OF OMNIDIRECTIONAL CAMERA ROBOT

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/319,882

(22) PCT Filed: Apr. 12, 2016

(86) PCT No.: PCT/JP2016/061848
§ 371 (c)(1),
(2) Date: Dec. 19, 2016

(87) PCT Pub. No.: WO2017/179136
PCT Pub. Date: Oct. 19, 2017

(65) Prior Publication Data
US 2018/0354138 A1 Dec. 13, 2018

(51) Int. Cl.
*B25J 9/16* (2006.01)
*G03B 37/02* (2006.01)
*H04N 5/232* (2006.01)
*G03B 17/56* (2006.01)
*G03B 29/00* (2006.01)
*G06N 3/00* (2006.01)

(52) U.S. Cl.
CPC .......... *B25J 9/1697* (2013.01); *G03B 17/561* (2013.01); *G03B 29/00* (2013.01); *G03B 37/02* (2013.01); *H04N 5/2328* (2013.01); *H04N 5/23238* (2013.01); *H04N 5/23299* (2018.08); *G05B 2219/45184* (2013.01); *G06N 3/008* (2013.01)

(58) Field of Classification Search
USPC .......................................................... 348/36
See application file for complete search history.

(56) References Cited

U.S. PATENT DOCUMENTS

| | | | | |
|---|---|---|---|---|
| 6,486,877 B1* | 11/2002 | Watanabe | ............... | G06T 17/10 345/420 |
| 2003/0184778 A1* | 10/2003 | Chiba | .................. | H04N 1/3876 358/1.9 |
| 2010/0222925 A1* | 9/2010 | Anezaki | ............... | G05D 1/0253 700/253 |
| 2011/0106313 A1* | 5/2011 | Lee | ......................... | B25J 5/007 700/259 |

(Continued)

FOREIGN PATENT DOCUMENTS

JP    2006-185438    7/2006

*Primary Examiner* — Alexander Gee
(74) *Attorney, Agent, or Firm* — Lex IP Meister, PLLC

(57) ABSTRACT

The present invention is to provide a system, a method, and a program for adjusting the altitude of a robot provided with an omnidirectional camera which provides entire visual field images with improved image quality. The system 1 for adjusting the altitude of a robot 200 provided with an omnidirectional camera 100 acquires the altitude of the omnidirectional camera 100, adjusts the altitude of the robot 200 so that the acquired altitude is a constant, and generates a 360-degree image taken by the omnidirectional camera 100 by synthetic processing in a predetermined altitude error range.

8 Claims, 5 Drawing Sheets

(56) References Cited

U.S. PATENT DOCUMENTS

| | | | | |
|---|---|---|---|---|
| 2014/0152765 A1* | 6/2014 | Okuda | ............... | H04N 5/23238 348/36 |
| 2014/0375762 A1* | 12/2014 | Ohki | ................. | H04N 5/23238 348/36 |
| 2015/0062363 A1* | 3/2015 | Takenaka | ........... | H04N 5/23238 348/218.1 |
| 2016/0105609 A1* | 4/2016 | Pettegrew | ............ | H04N 5/3572 348/37 |

\* cited by examiner

SYSTEM, METHOD, AND PROGRAM FOR ADJUSTING ALTITUDE OF OMNIDIRECTIONAL CAMERA ROBOT

TECHNICAL FIELD

The present invention relates to a system, a method, and a program for adjusting the altitude of a robot provided with an omnidirectional camera.

BACKGROUND ART

Recently, omnidirectional cameras have been proposed, which are capable to take 360-degree panoramic images in all directions to right and left and to up and down. To take entire visual field images as 360-degree panoramic images, such as omnidirectional cameras are capable to take images in all directions by using an imaging device consisting of a plurality of cameras or special lenses and then display some or all of the taken entire visual field images as display images.

To accomplish this, a constitution which is provided with an omnidirectional camera installed in a robot, etc., to take entire visual field images around the robot is disclosed (refer to Patent Document 1).

CITATION LIST

Patent Literature

Patent Document 1: JP 2006-185438 A

SUMMARY OF INVENTION

However, if an altitude difference vertical interval exists in the route of the robot, the constitution of Patent Document 1 hardly keeps the altitude of the omnidirectional camera constant because the omnidirectional camera moves along with the motion of the robot. Therefore, the image quality of the entire visual field images may be poor.

An objective of the present invention is to provide a system, a method, and a program for adjusting the altitude of a robot provided with an omnidirectional camera which provides entire visual field images with improved image quality.

The first aspect of the present invention provides a system for adjusting the altitude of a robot provided with an omnidirectional camera, including:

an altitude acquisition unit that acquires the altitude of the omnidirectional camera;

an altitude adjusting unit that adjusts the altitude of the robot so that the acquired altitude is a constant; and a synthetic-image generating unit that generates a 360-degree image taken by the omnidirectional camera by synthetic processing in a predetermined altitude error range.

According to the first aspect of the present invention, a system for adjusting the altitude of a robot provided with an omnidirectional camera acquires the altitude of the omnidirectional camera, adjusts the altitude of the robot so that the acquired altitude is a constant, and generates a 360-degree image taken by the omnidirectional camera by synthetic processing in a predetermined altitude error range.

The first aspect of the present invention falls into the category of a system for adjusting the altitude of a robot provided with an omnidirectional camera, but the categories of the method, the program, etc., have the same functions and effects.

The second aspect of the present invention provides the system according to the first aspect of the present invention, further including:

a coordinate acquisition unit that acquires the coordinates of at least two points in the robot; and an altitude calculation unit that calculates the altitude of the omnidirectional camera based on the angle between a line connecting the acquired coordinates and a line connecting each of the two points with the omnidirectional camera.

According to the second aspect of the present invention, the system according to the first aspect of the present invention acquires the coordinates of at least two points in the robot and calculates the altitude of the omnidirectional camera based on the acquired coordinates and an angle between a line connecting the acquired coordinates and a line connecting each of the two points with the omnidirectional camera.

The third aspect of the present invention provides the system according to the second aspect of the present invention, in which the altitude adjusting unit further adjusts the altitude of the omnidirectional camera based on an altitude calculated by the altitude calculation unit.

According to the third aspect of the present invention, the system according to the second aspect of the present invention further adjusts the altitude of the omnidirectional camera based on the altitude calculated by an altitude calculation unit.

The fourth aspect of the present invention provides a method for adjusting the altitude of a robot provided with an omnidirectional camera, including the steps of:

acquiring the altitude of the omnidirectional camera;

adjusting the altitude of the robot so that the acquired altitude is a constant; and generating a 360-degree image taken by the omnidirectional camera by synthetic processing in a predetermined altitude error range.

The fifth aspect of the present invention provides a computer program product for use in a system for adjusting the altitude of a robot provided with an omnidirectional camera, including a non-transitory computer usable medium having a set of instructions physically embodied therein, the set of instructions including computer readable program code, which when executed by the system causes the information processing unit to:

acquire the altitude of the omnidirectional camera;

adjust the altitude of the robot so that the acquired altitude is a constant; and generate a 360-degree image taken by the omnidirectional camera by synthetic processing in a predetermined altitude error range.

The present invention can provide a system, a method, and a program for adjusting the altitude of a robot provided with an omnidirectional camera which provides entire visual field images with improved image quality.

DESCRIPTION OF EMBODIMENTS

Embodiments of the present invention will be described below with reference to the attached drawings. However, these are illustrative only, and the technological scope of the present invention is not limited thereto.

Overview of System for Adjusting Altitude of Robot Provided with Omnidirectional Camera 1

Figure 1:
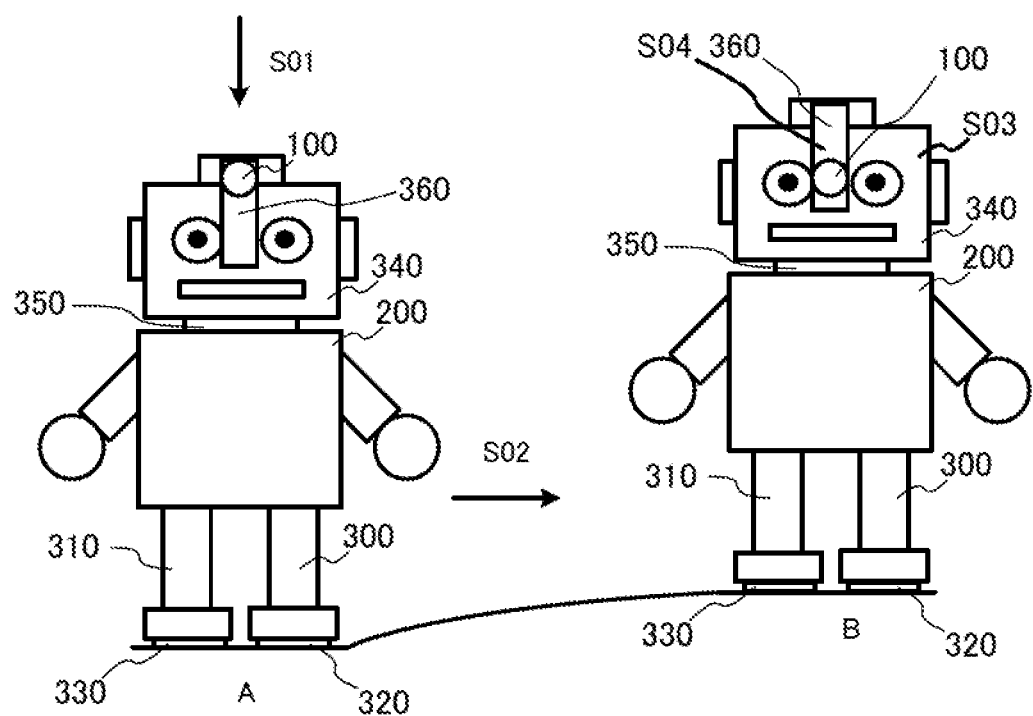
FIG. 1 shows an overview of the system for adjusting the altitude of a robot provided with an omnidirectional camera 1.

An overview of the system for adjusting the altitude of a robot provided with an omnidirectional camera 1 according to a preferable embodiment of the present invention will be described below with reference to FIG. 1. FIG. 1 is to show an overall view of the system for adjusting the altitude of a robot provided with an omnidirectional camera 1 according to a preferable embodiment of the present invention. The system for adjusting the altitude of a robot provided with an omnidirectional camera 1 includes a robot 200.

In FIG. 1, the number of the robot 200 is not limited to one and may be two or more. The robot 200 may be either an existing device or a virtual device, or the both.

The robot 200 is a machine that receives instructions for continuous or random automated operations autonomously and instructions from a user and then behaves based on these instructions. The robot 200 may receive an instruction input from an information terminal not shown in the attached drawings.

The robot 200 includes a body trunk composed of a head 340, a neck 350, and a body and limbs consisting of upper and lower limbs 300, 310. The head 340 has an applied part 360 to which an omnidirectional camera 100 is applied. The bottom of the lower limb 310 has rollers 320, 330. The robot 200 performs rotation, movement, etc. by driving the lower limbs 300, 310 or the rollers 320, 330. The robot 200 also changes the altitude of the omnidirectional camera 100 by driving the applied part 360. The robot 200 also changes the altitude of the omnidirectional camera 100 by changing the length of the neck 350. The robot 200 may move, may change the altitude of the omnidirectional camera 100, or may change its altitude by driving a part other than the above-mentioned parts or all the above-mentioned parts.

The omnidirectional camera 100 is an imaging device consisting of a combination of a plurality of cameras or of a plurality of special lenses. The omnidirectional camera 100 takes a 360-degree panoramic image in all directions to right and left and to up and down as an entire visual field image. The omnidirectional camera 100 may have a configuration that takes a plurality of images in all directions from a certain one point and subjects the taken images to synthetic processing to generate an entire visual field image.

The robot 200 receives an imaging instruction input and then takes an entire visual field image with the omnidirectional camera 100 (Step S01). The robot 200 may have a configuration that takes an entire visual field image at any one given point in time or that receives an instruction input from an information terminal not shown in the attached drawings or an instruction input to an input unit that receives an input not shown in the attached drawings.

If receiving a move instruction input, the robot 200 acquires the altitude of the omnidirectional camera 100 at the current position A and then moves to the destination position B specified by the move instruction (Step S02). The robot 200 acquires the altitude of the omnidirectional camera 100 with an altitude sensor, etc., that is installed in this omnidirectional camera 100. The robot 200 moves to the specified point by driving the rollers 320, 330. The robot 200 may acquire the altitudes of the omnidirectional camera 100 and the robot itself by a means other than the altitude sensor. The robot 200 may move to the specified point by driving the lower limbs 300, 310 or other structures.

The robot 200 acquires the altitude of the omnidirectional camera 100 after it moves (Step S03).

The robot 200 compares the altitudes of the omnidirectional camera 100 before and after it moves and then judges whether or not an altitude change exists. If judging that an altitude change exists, the robot 200 changes the altitude of the omnidirectional camera 100 or the robot itself to adjust the altitude of the omnidirectional camera 100 (Step S04). In the step S04, the robot 200 may adjust the altitude of the omnidirectional camera 100 by driving the applied part 360 to which the omnidirectional camera 100 is applied or by changing the altitude of the neck 350.

The robot 200 may be provided with an altitude sensor, etc., in the bottoms of the lower limbs 300, 310. In this case, the robot 200 acquires the coordinates of the two points at which the altitude sensors are provided and calculates the altitude of the omnidirectional camera 100 based on an angle between a line connecting the acquired coordinates and a line connecting each of the two points with the omnidirectional camera 100. The robot 200 may perform the process of the step S04 described above based on the calculated altitude.

Configuration of System for Adjusting Altitude of Robot Provided with Omnidirectional Camera 1

Figure 2:
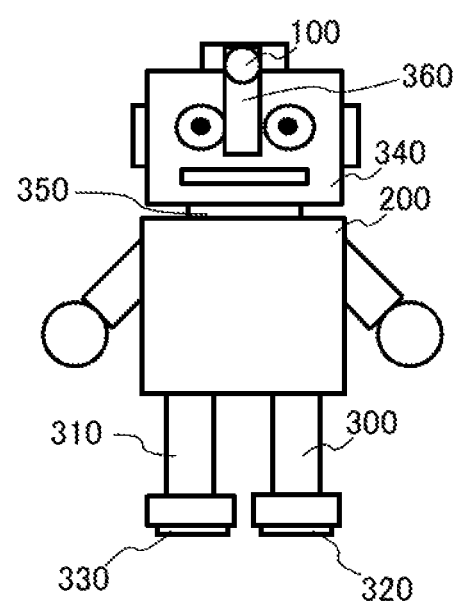
FIG. 2 shows an overall configuration diagram of the system for adjusting the altitude of a robot provided with an omnidirectional camera 1.

The configuration of the system for adjusting the altitude of a robot provided with an omnidirectional camera 1 according to a preferable embodiment of the present invention will be described below with reference to FIG. 2. FIG. 2 shows the configuration of the system for adjusting the altitude of a robot provided with an omnidirectional camera 1 according to a preferable embodiment of the present invention. The system for adjusting the altitude of a robot provided with an omnidirectional camera 1 includes a robot 200. The number of the robot 200 is not limited to one and may be two or more. The robot 200 may be either an existing device or a virtual device, or the both.

The robot 200 is the above-mentioned machine with the functions to be described later. The omnidirectional camera 100 may be separated from the robot 200. In this case, the omnidirectional camera 100 and the robot 200 may have a configuration to connect with each other through wired connection, near field communication, IR communication, public line networks, etc.

The robot 200 includes a body trunk and limbs as described above. The applied part 360 changes the altitude and the position of the omnidirectional camera 100 by driving the applied omnidirectional camera 100 in all directions to front and back, to right and left, and to up and down with a motor, etc. The robot 200 bends and stretches the lower limbs 300, 310 by driving them to move. The robot 200 moves and rotates by driving the rollers 320, 330. The robot 200 may move or perform other motions, may change the altitude or the position of the omnidirectional camera 100 by driving a part other than the above-mentioned parts or all the above-mentioned parts.

Functions

Figure 3:
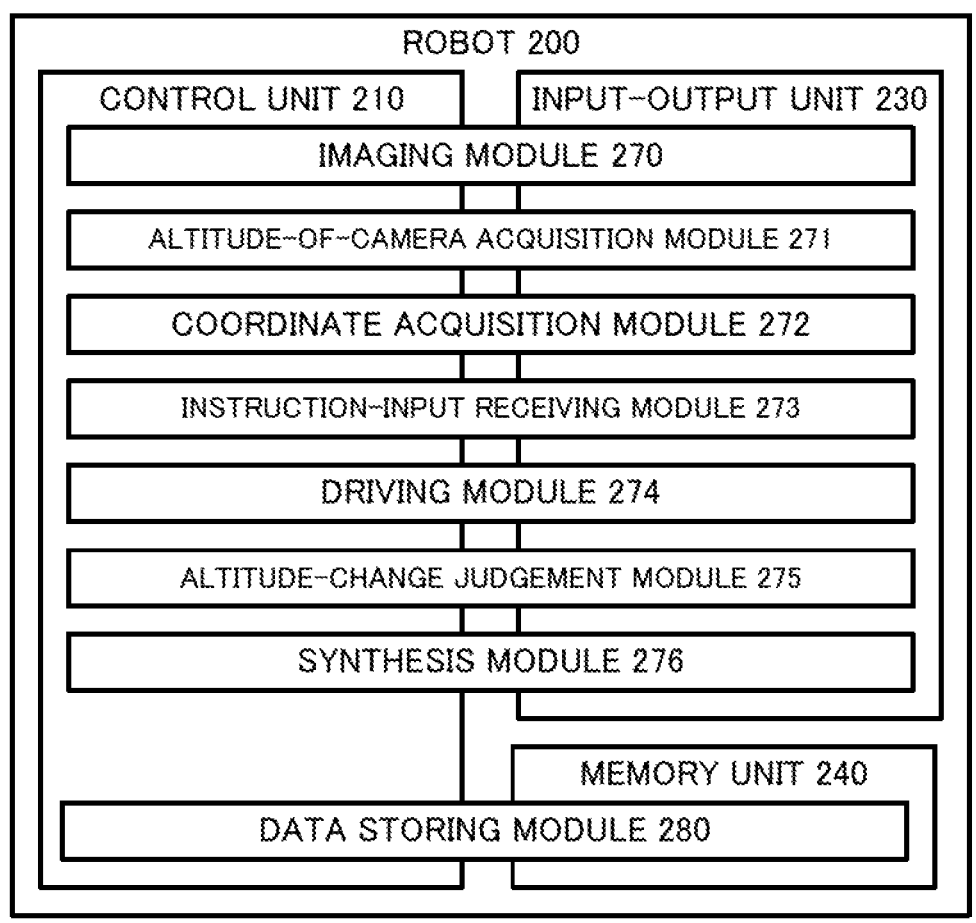
FIG. 3 shows a functional block diagram of the robot 200.

The functions of the system for adjusting the altitude of a robot provided with an omnidirectional camera 1 according to a preferable embodiment of the present invention will be described below with reference to FIG. 3. FIG. 3 shows a functional block diagram of the robot 200.

The robot 200 includes a control unit 210 such as a central processing unit (hereinafter referred to as "CPU"), a random access memory (hereinafter referred to as "RAM"), and a read only memory (hereinafter referred to as "ROM") and a communication unit such as a device capable of communicating with other devices, for example, a Wireless Fidelity or Wi-Fi® enabled device complying with IEEE 802.11. The robot 200 also includes an input-output unit 230 including a display unit outputting and displaying data and images that have been processed by the control unit 210; and an input unit such as a touch panel, a keyboard, or a mouse that receives an input from the user. The robot 200 also includes an actuation device such as a motor that drives a part of or the entire of the robot 200 itself. The robot 200 also includes an altitude detecting device such as a sensor that detects the altitude of the omnidirectional camera 100. The robot 200 also includes a memory unit 240 such as a hard disk, a semiconductor memory, a record medium, or a memory card to store data.

In the robot 200, the control unit 210 reads a predetermined program to achieve an imaging module 270, an altitude-of-camera acquisition module 271, a coordinate acquisition module 272, an instruction-input receiving module 273, a driving module 274, an altitude-change judgement module 275, and a synthesis module 276 in cooperation with the input-output unit 230. Furthermore, in the robot 200, the control unit 210 reads a predetermined program to achieve a data storing module 280 in cooperation with the memory unit 240.

Altitude Adjustment Process

Figure 4:
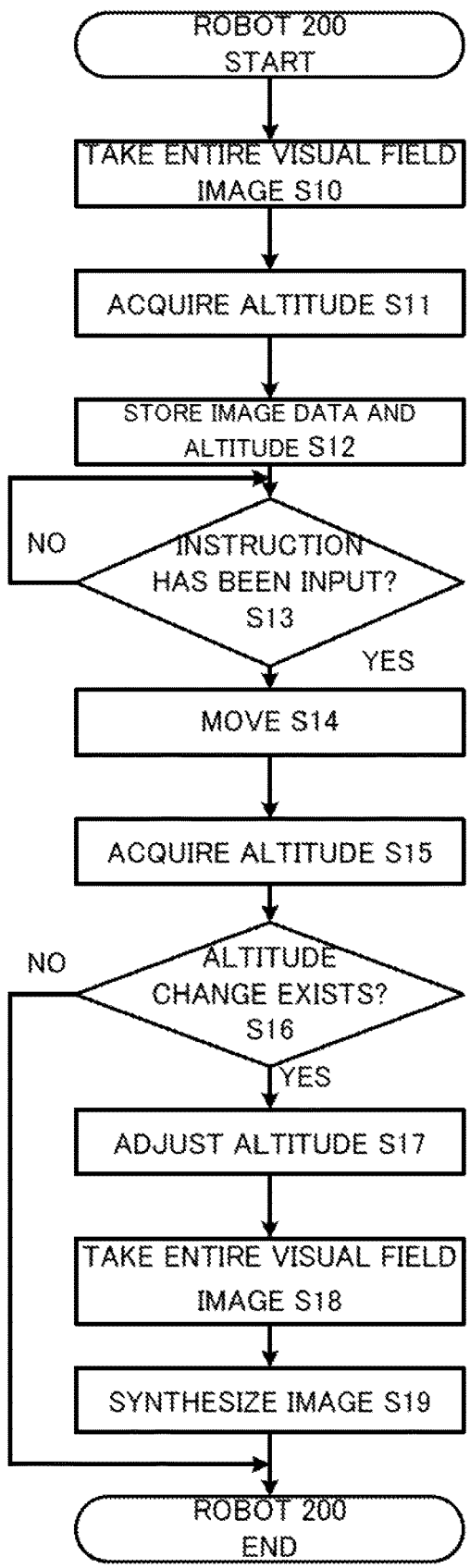
FIG. 4 shows a flow chart illustrating the altitude change process performed by the robot 200.

The altitude adjustment process performed by the robot 200 will be described below with reference to FIG. 4. FIG. 4 shows a flow chart illustrating the altitude adjustment process performed by the robot 200. The tasks executed by each of the above-mentioned modules will be described below together with this process.

The imaging module 270 receives an imaging instruction input and then takes an entire visual field image (Step S10). In the step S10, the imaging module 270 receives an imaging instruction input from an information terminal not shown in the attached drawings that runs a dedicated application and receives an input from an imaging switch provided in the omnidirectional camera 100 or the robot 200 and then takes an entire visual field image. The imaging module 270 takes images such as still or moving images as entire visual field images. The entire visual field image is a 360-degree image in all directions to right and left and to up and down. The imaging module 270 may receive an imaging instruction input other than the above-mentioned examples.

The altitude-of-camera acquisition module 271 acquires the current altitude of the omnidirectional camera 100 (Step S11). In the step S11, the altitude-of-camera acquisition module 271 acquires the current altitude based on an atmospheric pressure detected by a sensor, GPS data, etc.

In the step S11, the coordinate acquisition module 272 may be provided on the points in the bottoms of the lower limbs 300, 310 to calculate the current altitude of the omnidirectional camera 100 based on an angle between a line connecting the coordinates of the two points and a line connecting each of the two points with the omnidirectional camera 100. The coordinate acquisition module 272 calculates the altitude of the omnidirectional camera 100 by triangulation. The altitude of the omnidirectional camera 100 may be calculated based on a set of distances from the two points and the omnidirectional camera 100 to their centroid or may be calculated by other methods.

The coordinate acquisition module 272 only has to be provided on at least two points that are not limited to the above-mentioned examples and may be in other places. The number of the points may be changed as needed.

The data storing module 280 associates and stores the image data of the entire visual field image taken in the step S10 with the current altitude acquired in the step S11 (Step S12).

The instruction-input receiving module 273 judges whether or not the instruction-input receiving module 273 has received an instruction input to move the robot 200 and change the position of the omnidirectional camera 100 (Step S13). In the step S13, the instruction-input receiving module 273 judges whether or not the instruction-input receiving module 273 has received an instruction input from an information terminal not shown in the attached drawings, for example, to move the robot 200 to a predetermined point or to change the position of the omnidirectional camera 100 to a predetermined point, or has received an instruction input to move the omnidirectional camera 100 to a predetermined point with a touch panel, a keyboard, etc. In the step S13, if the instruction-input receiving module 273 judges that the instruction-input receiving module 273 has not received an instruction input (NO), this step is repeated until receiving an instruction input.

On the other hand, if the instruction-input receiving module 273 judges that the instruction-input receiving module 273 has received an instruction input (YES) in the step S13, the driving module 274 drives a part of or the entire of the robot 200 based on the instruction to move the robot 200 (Step S14). In the step S14, the driving module 274 rotates the rollers 320, 330 to move the robot 200. The driving module 274 may drive a part of or the entire of another robot 200 to move the robot 200.

The altitude-of-camera acquisition module 271 acquires the altitude of the omnidirectional camera 100 after it moves. (Step S15). In the step S15, the detailed explanation of the process performed by the altitude-of-camera acquisition module 271 is omitted because it is the same as that of the process performed in the above-mentioned step S11.

The altitude-change judgement module 275 compares the altitude of the omnidirectional camera 100 before it moves, which is stored in the data storing module 280, with that of the omnidirectional camera 100 after it moves, and then the altitude-change judgement module 275 judges whether or not an altitude change exists (Step S16). In the step S16, even if an altitude change exists but falls within a predetermined threshold or less, the altitude-change judgement module 275 may judge that no altitude change exists. The predetermined threshold is, for example, 1 cm, 2 cm, or several centimeters. The threshold may be changed as needed.

If judging that no altitude change exists (NO) in the step S16, the altitude-change judgement module 275 ends this process.

If the altitude-change judgement module 275 judges that an altitude change exists (YES) in the step S16, the driving module 274 adjusts the altitude of the omnidirectional camera 100 so that the altitude change may be constant (Step S17). In the step S17, the driving module 274 drives the applied part 360 to adjust the altitude of the omnidirectional camera 100. Furthermore, in the step S17, the driving module 274 drives the neck 350 to change its length and then adjusts the altitude of the robot 200 to adjust the altitude of the omnidirectional camera 100. In the step S17, without limitation to the above-mentioned examples, the driving module 274 may drive a part of or the entire of another robot 200 to adjust the altitude of the omnidirectional camera 100 or may adjust the altitude of the robot 200 to adjust the altitude of the omnidirectional camera 100.

In the step S17, the coordinate acquisition module 272 may be provided on the points in the bottoms of the lower limbs 300, 310 to calculate the current altitude of the omnidirectional camera 100 based on an angle between a line connecting the coordinates of the two points and a line connecting each of the two points with the omnidirectional camera 100. The coordinate acquisition module 272 calculates the altitude of the omnidirectional camera 100 by triangulation. The altitude of the omnidirectional camera 100 may be calculated based on a set of distances from the two points and the omnidirectional camera 100 to their centroid or may be calculated by other methods. The process to be described later may be performed based on the altitude of the omnidirectional camera 100 calculated in this way.

The coordinate acquisition module 272 only has to be provided on at least two points that are not limited to the above-mentioned examples and may be in other places. The number of the points may be changed as needed.

Figure 5:
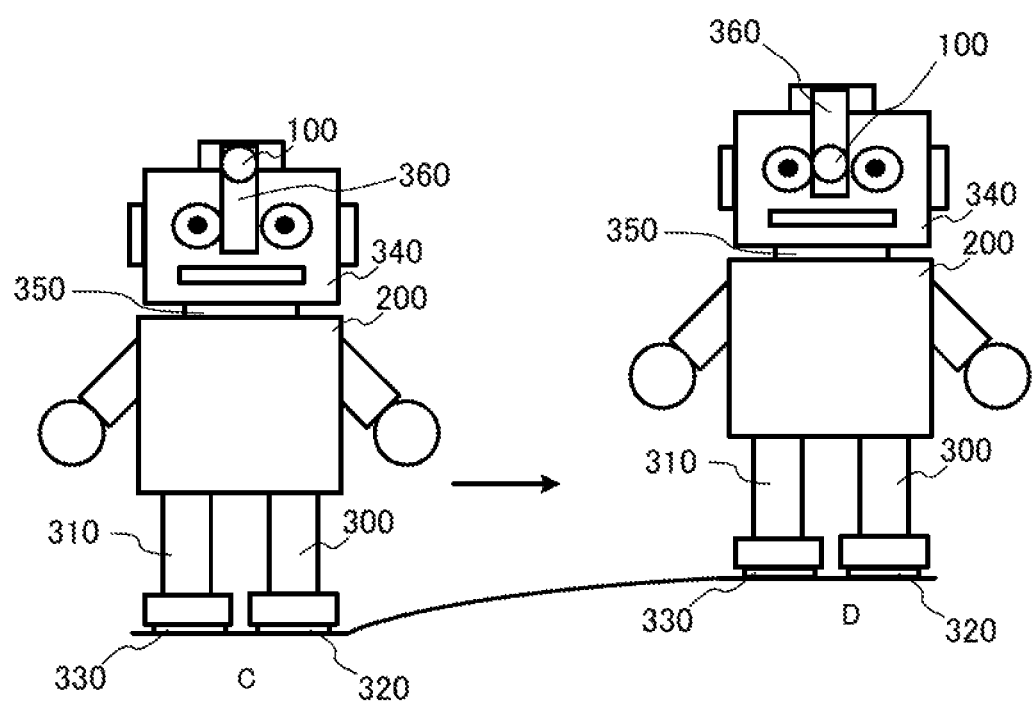
FIG. 5 shows the robots 200 before and after the altitude is adjusted.

FIG. 5 shows how the robot 200 performs the above-mentioned steps S14 to S17. In FIG. 5, the robot 200 is assumed to move from the current spot C to the destination spot D. In FIG. 5, the current spot C is lower than the destination spot D.

The robot 200 receives a move instruction to the destination spot D and then drives the rollers 320, 330 to move from the current spot C to the destination spot D. The robot 200 compares the altitude of the omnidirectional camera 100 stored at the current spot C with that of the omnidirectional camera 100 acquired at the destination spot D and then calculates the altitude change. In FIG. 5, the robot 200 decreases the altitude of the omnidirectional camera 100 to maintain a constant altitude change. The robot 200 drives the applied part 360 to decrease the altitude of the omnidirectional camera 100 and then adjust the altitudes of the omnidirectional camera 100 at the current spot C and at the destination spot D so that they are approximately equal.

The imaging module 270 takes an entire visual field image at the destination point (Step S18).

The synthesis module 276 synthesizes one image by combining the image data of the entire visual field image stored at a current spot with that of the entire visual field image taken at the destination spot in a predetermined error range (Step S19). In the step S19, the synthesis module 276 recognizes the entire visual field image stored at the current spot and the entire visual field image taken at the destination spot and then superimposes the corresponding parts on each other to synthesize one image. The phrase "in a predetermined error range" means not only that the corresponding parts correspond perfectly to each other but also that they have minor deviations. In the step S19, the synthesis module 276 may combine a plurality of image data by other methods.

To achieve the means and the functions that are described above, a computer (including a CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 System for adjusting altitude of robot provided with omnidirectional camera
100 Omnidirectional camera
200 Robot

What is claimed is:

1. A system for adjusting an altitude of a robot provided with an omnidirectional camera, comprising:
    an altitude detecting device that acquires the altitude of the omnidirectional camera; and
    a processor that:
        adjusts the altitude of the robot at a destination spot when the robot moves from a current spot to the destination spot so that the altitude acquired at the current spot and the altitude acquired at the destination spot are approximately equal; and
        generates a 360-degree image at a desired point taken by the omnidirectional camera by synthetic processing on a plurality of images including a first image at the desired point taken by the omnidirectional camera at the current spot and a second image at the desired point taken by the omnidirectional camera at the destination spot in a predetermined altitude error range, wherein the synthetic processing is performed by superimposing corresponding parts of the first image and second image on each other.

2. The system according to claim 1, wherein the CPU acquires the coordinates of at least two points in the robot; and calculates the altitude of the omnidirectional camera based on the angle between a line connecting the acquired coordinates and a line connecting each of the two points with the omnidirectional camera.

3. The system according to claim 2, wherein the CPU further adjusts the altitude of the omnidirectional camera based on the calculated altitude.

4. A method for adjusting an altitude of a robot provided with an omnidirectional camera, comprising:
    acquiring the altitude of the omnidirectional camera;
    adjusting the altitude of the robot at a destination spot when the robot moves from a current spot to the destination spot so that the altitude acquired at the current spot and the altitude acquired at the destination spot are approximately equal; and
    generating a 360-degree image at a desired point taken by the omnidirectional camera by synthetic processing on a plurality of images including a first image at the desired point taken by the omnidirectional camera at the current spot and a second image at the desired point taken by the omnidirectional camera at the destination spot in a predetermined altitude error range, wherein the synthetic processing is performed by superimposing corresponding parts of the first image and second image on each other.

5. A computer program product for use in a system for adjusting an altitude of a robot provided with an omnidirectional camera, comprising a non-transitory computer usable medium having a set of instructions physically embodied therein, the set of instructions including computer readable program code, which when executed by the system causes the information processing unit to:
- acquire the altitude of the omnidirectional camera;
- adjust the altitude of the robot at a destination spot when the robot moves from a current spot to the destination spot so that the altitude acquired at the current spot and the altitude acquired at the destination spot are approximately equal; and
- generate a 360-degree image at a desired point taken by the omnidirectional camera by synthetic processing on a plurality of images including a first image at the desired point taken by the omnidirectional camera at the current spot and a second image at the desired point taken by the omnidirectional camera at the destination spot in a predetermined altitude error range, wherein the synthetic processing is performed by superimposing corresponding parts of the first image and second image on each other.

6. The system according to claim 1, wherein the robot includes a head having an applied part to which the omnidirectional camera is applied, a body, and a neck connecting the head and the body, and wherein the system further comprises an actuation device that drives the neck to change a length of the neck, thereby adjusting the altitude.

7. The method according to claim 4, wherein the robot includes a head having an applied part to which the omnidirectional camera is applied, a body, and a neck connecting the head and the body, and wherein the method further comprises driving the neck to change a length of the neck, thereby adjusting the altitude.

8. The computer program product according to claim 5, wherein the robot includes a head having an applied part to which the omnidirectional camera is applied, a body, and a neck connecting the head and the body, and wherein the set of instructions including computer readable program code, which when executed by the system causes the information processing unit to further drive the neck to change a length of the neck, thereby adjusting the altitude.

* * * * *